US006640685B2

(12) United States Patent
Hamby

(10) Patent No.: US 6,640,685 B2
(45) Date of Patent: Nov. 4, 2003

(54) CLOSED LOOP ELECTROHYDRAULIC ACTUATOR CONTROL CIRCUIT

(76) Inventor: David M. Hamby, 207 Brittany Park, Anderson, SC (US) 29621

( * ) Notice: Subject to any disclaimer, the term of this patent is extended or adjusted under 35 U.S.C. 154(b) by 0 days.

(21) Appl. No.: 10/071,757

(22) Filed: Feb. 6, 2002

(65) Prior Publication Data

US 2002/0145399 A1 Oct. 10, 2002

Related U.S. Application Data

(60) Provisional application No. 60/267,159, filed on Feb. 7, 2001.

(51) Int. Cl.⁷ .................................................. F15B 9/03
(52) U.S. Cl. ...................................... 91/363 R; 91/433
(58) Field of Search .............................. 91/363 R, 361, 91/433

(56) References Cited

U.S. PATENT DOCUMENTS

| | | | | |
|---|---|---|---|---|
| 3,038,449 A | * | 6/1962 | Murphy, Jr. et al. | 91/363 R |
| 3,874,405 A | | 4/1975 | Thayer | 137/596.16 |
| 3,987,702 A | | 10/1976 | Boss et al. | 91/1 |
| 4,164,167 A | * | 8/1979 | Imai et al. | 91/363 R |
| 4,343,365 A | | 8/1982 | Rajagopal et al. | 172/4 |
| 4,649,706 A | | 3/1987 | Hutson | 60/420 |
| 4,721,027 A | | 1/1988 | Keller et al. | 91/387 |
| 4,955,461 A | | 9/1990 | Keir | 187/9 R |
| 5,082,021 A | | 1/1992 | Yonezawa | 137/596.2 |
| RE33,846 E | | 3/1992 | Kramer et al. | 91/361 |
| 5,979,498 A | | 11/1999 | Zenker et al. | 137/596.15 |

* cited by examiner

Primary Examiner—Edward K. Look
Assistant Examiner—Thomas E. Lazo
(74) Attorney, Agent, or Firm—Joseph T. Guy; Nexsen Pruet Jacobs & Pollard, LLC

(57) ABSTRACT

A hydraulic control system for controlling expansion and contraction of a cylinder. The cylinder comprises an extension chamber and a contraction chamber. The hydraulic control system comprises a first servovalve comprising a first pressure supply port and a first pressure discharge port and adapted to selectively communicate the expansion chamber with the first pressure supply port and with the first pressure discharge port. A second servovalve, comprising a second pressure supply port and a second pressure discharge port, is adapted to selectively communicate the contraction chamber with the second pressure supply port and with the second pressure discharge port. A four way servovalve, comprising a third pressure supply port, a third pressure discharge port, a fourth pressure supply port and a fourth pressure discharge port, is adapted to selectively communicate the expansion chamber with the third pressure supply port and the third pressure discharge port and to selectively communicate the contraction chamber with the fourth pressure supply port and with the fourth pressure discharge port. A feedback device is provided which is capable of measuring at least one property of the cylinder and providing a signal proportional to the property. A controller is provided which is capable of receiving the signal and comparing the property to a desired property to determine a difference and activating at least one of the first servovalve, the second servovalve or the four way servovalve to decrease the difference.

33 Claims, 2 Drawing Sheets

CLOSED LOOP ELECTROHYDRAULIC ACTUATOR CONTROL CIRCUIT

RELATED APPLICATION

This application claims priority to U.S. Provisional Patent Application No. 60/267,159, filed Feb. 7, 2001.

BACKGROUND

A. Field of Invention

This invention relates to a closed-loop hydraulic system design for control of a linear hydraulic actuator using a unique valve circuit and a unique electronic control circuit to allow faster, more efficient, more accurate motion in both position and force loop control.

B. Description of Related Art

A typical closed-loop hydraulic system, in this case a hydraulic cylinder, is shown in FIG. 1, and usually consist of a hydraulic source, 3, with a hydraulic reservoir associated therewith, servovalves, 2, a cylinder, 1, and a position feedback device, 4. The function of the system is for the cylinder to move with great power to a mid-stroke position corresponding to an input command. The input command, typically a voltage signal, is conducted into one half of a comparator circuit in the control electronics, 5. Actual cylinder position, continually measured by the position feedback device, 4, is also conducted by voltage signal into the comparator. The difference between the input and the feedback, assuming there is a difference, is a position error signal that is then amplified by an amplifier, 6, of the control electronics and used to drive the servovalves, 2. Depending upon the error signal, the servovalve directs pressurized oil from the hydraulic source into either the cap or rod end of the cylinder, causing the cylinder to either extend or retract, respectively. Drain oil returns to the reservoir. This process of comparing command and feedback, then driving the cylinder correspondingly continues in a closed-loop fashion until the error is reduced to zero, meaning that the cylinder has necessarily reached its desired position corresponding to the original command. Any movement induced in the cylinder, such as from a varying external load, is met with a corresponding error signal and is similarly driven back to zero by the servo loop.

A closed-loop hydraulic system can be designed that operates on virtually any other mechanical characteristic, including force. The force loop system is similar to the position loop system above except that the position feedback device is replaced with a force feedback device. Any difference between the input command force and the actual force measured by the force feedback device results in an error signal that drives a servovalve. Like the closed loop position control, the cylinder continues pushing until the error is zero and the cylinder is pushing with a force that corresponds with the original command. Thus, any force variation induced in the system will likewise be automatically corrected.

The ultimate goal for many closed-loop hydraulic cylinder applications is twofold. First, to move into position, then to deliver a specific amount of hydraulic force to a work piece. The two operations must be done smoothly and seamlessly, though unfortunately, they are generally conducted at the expense of each other. Cylinder movement is performed prior to reaching the desired position at the work piece and is measured as displacement. Force is generated only once the work piece is met and is measured as pressure. Both operations are closed-loop controlled, though the operating characteristics for each are vastly different. To move the cylinder rapidly requires a high flow gain as compared to position error, meaning a relatively large valve. To move more slowly and precisely into position requires a low flow gain as compared to position error which requires a relatively smaller valve. Finally, building pressure once the cylinder has met the work piece requires extremely low flow gain as compared to pressure error signal which requires a very small valve and a dynamic system that is quite difficult to control.

Taking all of these requirements together has challenged the skilled artisan to achieve a hydraulic system which can rapidly move into position, accurately apply the correct pressure and also respond to a load. Since a hydraulic press is often a production machine, speed, part throughput, and tonnage capacity are paramount yet these are also in conflict with regards to developing a hydraulic system, and controller, which can achieve all of these goals while still responding to ever present budget constraints.

It is these conflicting control issues which have been circumvented with the present invention. Described herein is a hydraulic system, and control mechanism, which allows for rapid movement, accurate control and precision at the work piece.

SUMMARY OF THE INVENTION

It is an object of the present invention to provide an improved closed loop electrohydraulic system.

Particular features of the present invention include faster, more accurate, motion control by utilizing both position and force loop control.

These and other advantages, as will be realized, are provide in a hydraulic control system for controlling expansion and contraction of a cylinder. The cylinder comprises an extension chamber and a contraction chamber. The hydraulic control system comprises a first servovalve comprising a first pressure supply port, 100, and a first pressure discharge port, 101, and adapted to selectively communicate the expansion chamber with the first pressure supply port and with the first pressure discharge port. A second servovalve, comprising a second pressure supply port, 102, and a second pressure discharge port, 103, is adapted to selectively communicate the contraction chamber with the second pressure supply port and with the second pressure discharge port. A four way servovalve, comprising a third pressure supply port, 104, a third pressure discharge port, 105, a fourth pressure supply port, 106, and a fourth pressure discharge port, 107, is adapted to selectively communicate the expansion chamber with the third pressure supply port and the third pressure discharge port and to selectively communicate the contraction chamber with the fourth pressure supply port and with the fourth pressure discharge port. A feedback device is provided which is capable of measuring at least one property of the cylinder and providing a signal proportional to the property. A controller is provided which is capable of receiving the signal and comparing the property to a desired property to determine a difference and activating at least one of the first servovalve, the second servovalve or the four way servovalve to decrease the difference.

DETAILED DESCRIPTION

The invention will be described with reference to the Figures wherein similar elements are numbered accordingly.

Figure 1:
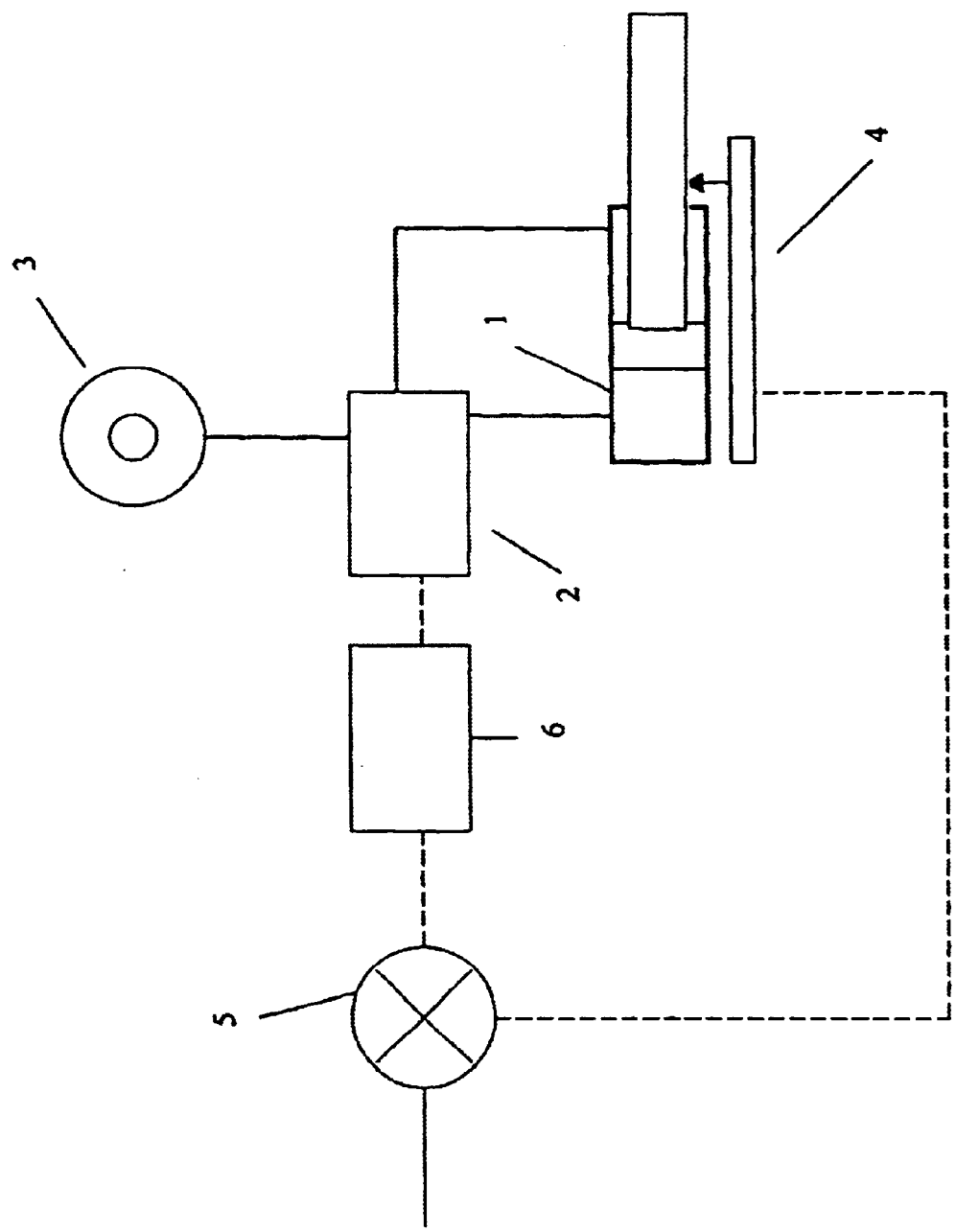
FIG. 1 illustrates a prior art servo circuit.
Figure 2:
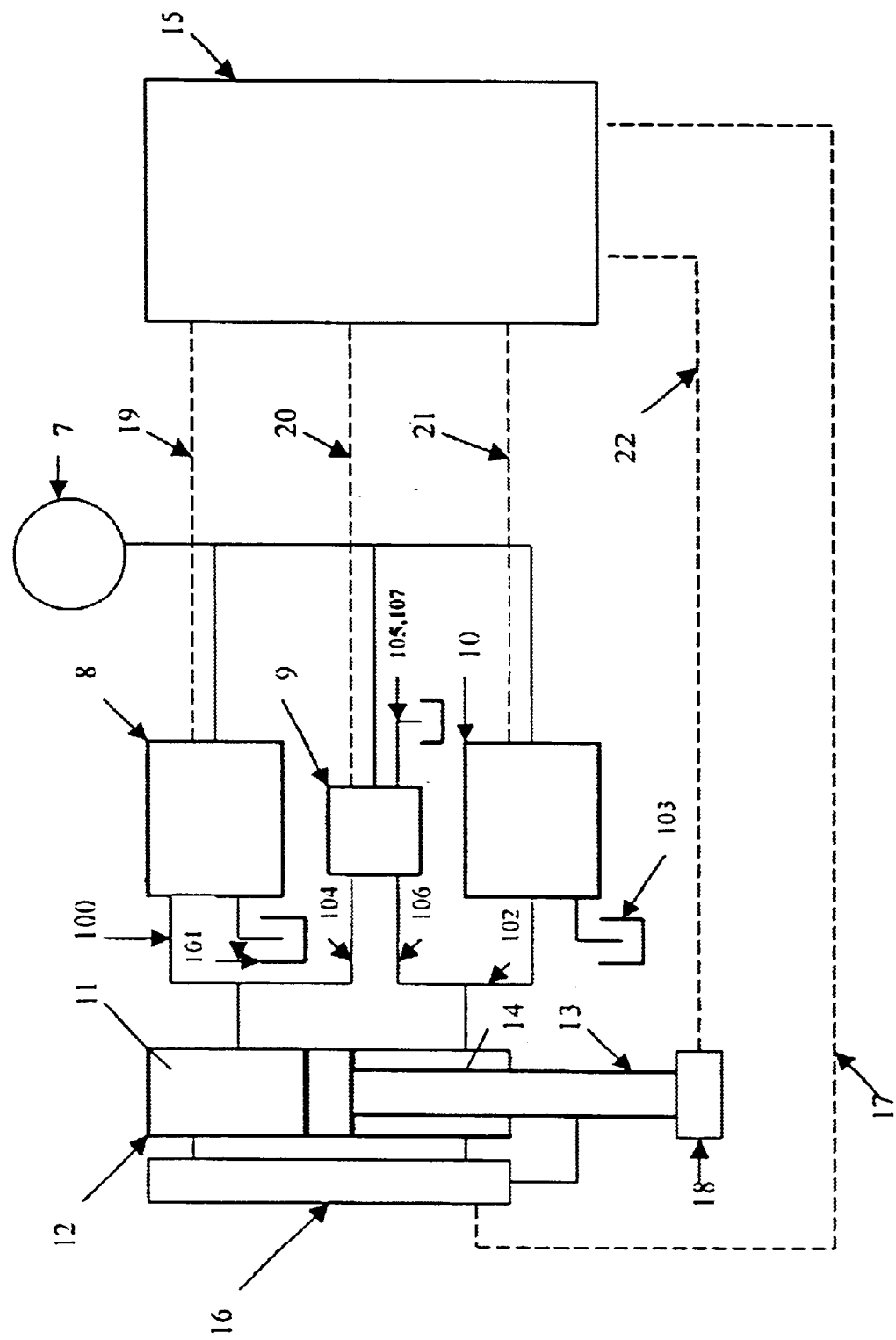
FIG. 2 illustrates an embodiment of the present invention.

A hydraulic system, in accordance with the present invention, is illustrated schematically in FIG. 2. The hydraulic flow is represented with solid lines and the electrical control circuits are represented with dashed lines. A hydraulic supply system, 7, and associated reservoir (not shown) supply hydraulic fluid to a series of servovalves, 8–10. In the extension mode a three way extender servovalve, 8, receives hydraulic fluid from the hydraulic supply system, 7, and supplies the hydraulic fluid to the top cavity, 11, of the cylinder, 12, thereby persuading the ram, 13, outward from the cylinder. A three way contraction servovalve, 10, passes hydraulic fluid from the bottom cavity, 14, to the reservoir of the hydraulic supply system, 7. The top cavity, 11, therefore expands and the bottom cavity, 14, contracts proportionally as the cylinder and associated ram extend. It would be apparent to a skilled artisan that contraction would be done in reverse with the contraction servovalve, 10, supplying hydraulic fluid to the bottom cavity, 14, and the extender servovalve, 8, passing hydraulic fluid to the reservoir of the hydraulic supply system, 7. A four way servovalve, 9, in parallel relationship to each three way servovalve provides the advantages of the present invention. As the ram, 13, is moving towards a predetermined work area the appropriate three way servovalve is the dominant supplier of hydraulic fluid. Once the ram comes into close proximity of the work area, say 0.010 inches or less, the supply of hydraulic fluid is decreased or ceased from the three way valve and the hydraulic fluid supply from the four way servovalve, 9, is initiated or increased In this way the three way servovalves can be used for gross control and the four way servovalve can be used for fine control of the ram position. For example, the extender servovalve, 8, may provide hydraulic fluid to the top cavity, 11, of the cylinder until the ram is within a predetermined distance of the work piece or is in contact with the workpiece. The four way servovalve may be closed completely thereby no fluid flow is traversing the four way servovalve. The contracting three way servovalve would be open allowing hydraulic fluid to traverse from the bottom cavity to the reservoir of the hydraulic supply system, 7. As the ram approaches the work piece within a predetermined distance the flow from the extending three way servovalve, 8, may be decreased or ceased and the four way servovalve may provide hydraulic fluid to the top cavity, 11, of the cylinder until the ram comes into physical contact with the work surface. A linear encoder, 16, monitors the position of the ram, 13, and relays the position to a controller, 15, along circuit line, 17. The controller, 15, sends a signal to the appropriate servovalve, 8–10, by the appropriate circuit line, 19–21, based on the position of the ram and the need to extend or contract and the necessity to utilize a three way valve or the four way valve as described above.

Upon the ram contacting the work piece the position of the ram is not as critical for control purposes as is the pressure exerted on the work piece. Therefore, a closed-loop control sequence utilizing a load cell, 18, is used instead of, or in addition to, the closed-loop control sequence utilizing the linear encoder, 16. The load cell, 18, communicates with the controller, 15, by a circuit line, 22. A feature of the hydraulic system of the present invention is the control which can be realized. This is particularly the case during a work cycle wherein the ram places pressure on a work piece. The four way valve is the primary valve for supplying hydraulic fluid to the appropriate cavity during precision operation. The three way valves are used to mitigate the flow of the four way valve such that a flow can be realized which is more precise than typically realized by the use of a four way valve alone. For example, the four way valve may provide flow to the top cavity, 11, of the cylinder. To increase control over the volume of hydraulic fluid delivered the extender three way valve may be opened partially upon command from the controller, 15, to allow a portion of the flow to return to the reservoir of the hydraulic supply system, 7. The fluid volume which bypasses the extender servovalve is preferably less than the volume supplied by the four way valve. The amount of hydraulic fluid flowing into the top cavity is therefore the difference between the output from the four way servovalve and the amount which bypasses the extender three way valve. This controlled bypass through the three way valve greatly increases the level of control available and allows the combined servovalves to act as a variable orifice servovalve. It would be apparent from the description that the contracting three way valve and the four way valve could be used in an analogous fashion.

The hydraulic circuit increases the control by intentional use and control of the bypass oil, either through the high flow servovalve itself or through an additional servo or proportional valve. In either case, pressurized oil is ported through the work port of the extender three way valve (A) or the work port of the contractor three way valve (B) to the discharge port (T) acting as an infinitely variable bypass orifice working in parallel with the cylinder. Thus, the pressure gain characteristics of the system, the rise in measured output pressure per valve shift displacement, is tunable during the critical force loop control.

The hydraulic circuit utilizes two individual three-way servovalves controlled as one by high speed motion controllers instead of the traditional four-way servovalve. This provides several advantages not currently available in the art. Valve spool A:B flow rate is irrelevant in machine design. In a traditional high performance closed loop hydraulic system, flow pressures in both sides of the servovalve must be kept close to equal, that is, flow resistance in each side of the valve must reflect the amount of oil being passed. Thus, the spool flow ratio of the valve actually needs to match the area ratio of the actuator. The two three-way servovalves operate completely independent of each other and can manage any ratio needed.

Pressure loss in the valves is reduced resulting in greater horsepower efficiency. In a traditional high performance closed loop hydraulic system, much energy is lost moving oil through the valve that is not involved in doing any useful work in the actuator. Again, using two three-way servovalves in place of a single four-way servovalve allows for independent control of the A and B ports of the actuator. By opening the meter-out side of the actuator fully pressure drop is minimized and horsepower saved.

The likelihood of actuator cavitation during high speed movement is greatly reduced. Once, again, independent control of the A and B ports of the actuator with independent servovalves allows each valve to match required flow/pressure demands of any situation.

Actuator ratio is irrelevant. Since valve spool A:B flow ratio no longer matters, actuator area no longer matters either. This benefit is the other side of the earlier argument. However, in the reality of machine design, designers actually often size actuators according to the spool flow ratios commonly available in servovalves. Specifically, designers size the rods of single rod cylinders to a specific area ratio, perhaps 2 to 1, commonly resulting in grossly oversized cylinder rods that can get quite costly.

In closed-loop electrohydraulics, the oil and the valves supply brute force, while control and precision is maintained by electronics. Servovalves respond to electrical commands dictated by either analog or digital circuits. A typical analog application might include a power supply, a closed loop driver card, a servovalve, and a feedback device of some type. A typical digital application might include a computer with motion control software, digital-to-analog input/output cards, a valve amplifier card, a servovalve, and feedback device of some type. Analog electronics are generally simpler and react almost simultaneously, with the speed of an electrical circuit. Digital electronics can be much more sophisticated, but ultimately depend upon the processor speed of the motion controller. In most cases, up until very recently, processor speed has been the primary limiting factor to highly sophisticated digital control schemes. Particularly, the thought of controlling two individual servovalves to behave as one servovalve was considered impossible.

This electronic control circuit is unique in that it uses a high-speed digital motion controller to monitor both position and force loops simultaneously throughout the motion profile. Neither has to be switched on or off depending upon the mode of operation of the system.

The inventive apparatus could be manufactured from commercially available sources by a person of ordinary skill in the art without undue experimentation. Through experimentation the parts listed in the Table have been determined to be particularly suitable for demonstrating the invention. It would be apparent that other parts could be used without departing from the scope of the invention.

TABLE

| Supplier | Part Designation |
|---|---|
| INTEGRATED TECHNOLOGIES | 2-1123-01 |
| DUPLOMATIC/SCHNEIDER | DSXP5HE-DOLI2O |
| LIN-ACT | 14.00JJ-3HKPS255 X 15.000 |
| ATOS | LIQZO-LE-5034L4/M 31 |

The invention has been described with reference to preferred embodiments. It would be apparent to one of ordinary skill in the art that alternations and modifications could be made without departing from the scope of the invention which is more clearly set forth in the claims which are appended hereto.

What is claimed is:

1. A hydraulic control system for controlling expansion and contraction of a cylinder wherein said cylinder comprises an extension chamber and a contraction chamber and said hydraulic control system comprises:
    a first three way servovalve comprising a first pressure supply port and a first pressure discharge port and adapted to selectively communicate said expansion chamber with said first pressure supply port and with said first pressure discharge port;
    a second three way servovalve comprising a second pressure supply port and a second pressure discharge port and adapted to selectively communicate said contraction chamber with said second pressure supply port and with said second pressure discharge port;
    a four way servovalve comprising a third pressure supply port, a third pressure discharge port, a fourth pressure supply port and a fourth pressure discharge port and said four way servovalve is adapted to selectively communicate said expansion chamber with said third pressure supply port and said third pressure discharge port and to selectively communicate said contraction chamber with said fourth pressure supply port and with said fourth pressure discharge port;
    a feedback device capable of measuring at least one property of said cylinder and providing a signal proportional to said property;
    a controller capable of receiving said signal and comparing said property to a desired property to determine a difference and activating at least one of said first servovalve, said second servovalve or said four way servovalve to decrease said difference.

2. The hydraulic control system of claim 1 wherein said controller does not activate said third pressure supply port, said third pressure discharge port, said fourth pressure supply port or said fourth pressure discharge port when said difference is above a predetermined value.

3. The hydraulic control system of claim 1 wherein said controller only activates said third pressure supply port, said third pressure discharge port, said fourth pressure supply port or said fourth pressure discharge port when said difference is below a predetermined value.

4. The hydraulic control system of claim 1 wherein said controller activates said first pressure discharge port and said third pressure supply port together to expand said cylinder.

5. The hydraulic control system of claim 1 wherein said controller activates said second pressure discharge port and said fourth pressure supply port together to contract said cylinder.

6. The hydraulic control system of claim 1 wherein said property is position.

7. The hydraulic control system of claim 1 wherein said property is pressure.

8. The hydraulic control system of claim 1 comprising two properties.

9. The hydraulic control system of claim 8 wherein one of said two properties is position and one of said two properties is pressure.

10. A hydraulic control system for controlling expansion and contraction of a cylinder wherein said cylinder comprises an extension chamber and a contraction chamber and said hydraulic control system comprises:
    a first servovalve comprising a first pressure supply port and a first pressure discharge port and adapted to selectively communicate said expansion chamber with said first pressure supply port and with said first pressure discharge port;
    a second servovalve comprising a second pressure supply port and a second pressure discharge port and adapted to selectively communicate said contraction chamber with said second pressure supply port and with said second pressure discharge port;
    a four way servovalve comprising a third pressure supply port, a third pressure discharge port, a fourth pressure supply port and a fourth pressure discharge port and said four way servovalve is adapted to selectively communicate said expansion chamber with said third pressure supply port and said third pressure discharge port and to selectively communicate said contraction chamber with said fourth pressure supply port and with said fourth pressure discharge port;
    a feedback device capable of measuring at least one property of said cylinder and providing a signal proportional to said property;
    a controller capable of receiving said signal and comparing said property to a desired property to determine a difference and activating at least one of said first servovalve, said second servovalve or said four way servovalve to decrease said difference wherein said controller activates said first servovalve, said second servovalve and said four way servovalve to expand said cylinder in accordance with the following process:

when said difference is above a first predetermined value said first pressure supply port supplies hydraulic fluid to said expansion chamber;

when said difference is below said first predetermined value and above a second predetermined threshold said third pressure supply port supplies hydraulic fluid to said expansion chamber;

when said difference is below said second predetermined threshold said third pressure supply port supplies hydraulic fluid to said expansion chamber and said first pressure discharge port discharges hydraulic fluid.

11. A hydraulic control system for controlling expansion and contraction of a cylinder wherein said cylinder comprises an extension chamber and a contraction chamber and said hydraulic control system comprises:

a first servovalve comprising a first pressure supply port and a first pressure discharge port and adapted to selectively communicate said expansion chamber with said first pressure supply port and with said first pressure discharge port;

a second servovalve comprising a second pressure supply port and a second pressure discharge port and adapted to selectively communicate said contraction chamber with said second pressure supply port and with said second pressure discharge port;

a four way servovalve comprising a third pressure supply port, a third pressure discharge port, a fourth pressure supply port and a fourth pressure discharge port and said four way servovalve is adapted to selectively communicate said expansion chamber with said third pressure supply port and said third pressure discharge port and to selectively communicate said contraction chamber with said fourth pressure supply port and with said fourth pressure discharge port;

a feedback device capable of measuring at least one property of said cylinder and providing a signal proportional to said property;

a controller capable of receiving said signal and comparing said property to a desired property to determine a difference and activating at least one of said first servovalve, said second servovalve or said four way servovalve to decrease said difference wherein said controller activates said first servovalve, said second servovalve and said four way servovalve to contract said cylinder in accordance with the following process:

when said difference is above a first predetermined value said second pressure supply port supplies hydraulic fluid to said contraction chamber;

when said difference is below said first predetermined value and above a second predetermined threshold said fourth pressure supply port supplies hydraulic fluid to said contraction chamber;

when said difference is below said second predetermined threshold said fourth pressure supply port supplies hydraulic fluid to said contraction chamber and said second pressure discharge port discharges hydraulic fluid.

12. A hydraulic control system for controlling expansion and contraction of a cylinder wherein said cylinder comprises an extension chamber and a contraction chamber and said hydraulic control system comprises:

a first servovalve comprising a first pressure supply port and a first pressure discharge port and adapted to selectively communicate said expansion chamber with said first pressure supply port and with said first pressure discharge port;

a second servovalve comprising a second pressure supply port and a second pressure discharge port and adapted to selectively communicate said contraction chamber with said second pressure supply port and with said second pressure discharge port;

a four way servovalve comprising a third pressure supply port, a third pressure discharge port, a fourth pressure supply port and a fourth pressure discharge port and said four way servovalve is adapted to selectively communicate said expansion chamber with said third pressure supply port and said third pressure discharge port and to selectively communicate said contraction chamber with said fourth pressure supply port with said fourth pressure discharge port;

a feedback device capable of measuring a property of said cylinder and providing a signal proportional to said property;

a controller capable of receiving said signal and comparing said property to a desired property to determine a difference and activating at least one of said first servovalve, said second servovalve or said four way servovalve to decrease said difference and wherein said controller selects between the following sequences:

a) said first pressure supply port supplies hydraulic fluid to said expansion chamber and said second pressure discharge port allows hydraulic fluid to exit said contraction chamber;

b) said second pressure supply port supplies hydraulic fluid to said contraction chamber ans said first pressure discharge port allows hydraulic fluid to exit said contraction chamber;

c) said third pressure supply port supplies hydraulic fluid to said expansion chamber and said second pressure discharge port allows hydraulic fluid to exit said contraction chamber;

d) said fourth pressure supply port supplies hydraulic fluid to said contraction chamber and said first pressure discharge port allows hydraulic fluid to exit said contraction chamber;

e) said first pressure supply port and said third pressure supply port supply hydraulic fluid to said expansion chamber and said second pressure discharge port allows hydraulic fluid to exit said contraction chamber; f) said second pressure supply port and said fourth pressure supply port supply hydraulic fluid to said contraction chamber and said first pressure discharge port allows hydraulic fluid to exit said expansion chamber;

g) said third pressure supply port supplies a first amount of hydraulic fluid to said expansion chamber and said first pressure discharge port allows a second amount of hydraulic fluid to exit said expansion chamber and said second pressure discharge port allows a third amount of hydraulic fluid to exit said contraction chamber wherein said first amount is more than said second amount and said third amount equals the difference between said first amount and said second amount; and h) said fourth pressure supply port supplies a fourth amount of hydraulic fluid to said contraction chamber and said second pressure discharge port allows a fifth amount of hydraulic fluid to exit said contraction chamber and said first pressure discharge port allows a sixth amount of hydraulic fluid to exit said expansion chamber wherein said fourth amount is more than said fifth amount and said sixth amount equals the difference between said fourth amount and said fifth amount.

13. The hydraulic control system of claim 12 wherein said controller does not activate said third pressure supply port, said third pressure discharge port, said fourth pressure supply port or said fourth pressure discharge port when said difference is above a predetermined value.

14. The hydraulic control system of claim 12 wherein said controller only activates said third pressure supply port, said third pressure discharge port, said fourth pressure supply port or said fourth pressure discharge port when said difference is below a predetermined value.

15. The hydraulic control system of claim 12 wherein said controller activates said first pressure discharge port and said third pressure supply port together to expand said cylinder.

16. The hydraulic control system of claim 12 wherein said controller activates said second pressure discharge port and said fourth pressure supply port together to contract said cylinder.

17. The hydraulic control system of claim 12 wherein said property is position.

18. The hydraulic control system of claim 12 wherein said property is pressure.

19. The hydraulic control system of claim 12 comprising two properties.

20. The hydraulic control system of claim 19 wherein one of said two properties is position and one of said two properties is pressure.

21. A system for controlling hydraulic fluid between a first chamber and a second chamber wherein said system comprises:
a first three way servovalve comprising a first pressure supply port and a first pressure discharge port and adapted to selectively communicate said first chamber with said first pressure supply port and with said first pressure discharge port;
a second three way servovalve comprising a second pressure supply port and a second pressure discharge port and adapted to selectively communicate said second chamber with said second pressure supply port and with said second pressure discharge port;
a four way servovalve comprising a third pressure supply port, a third pressure discharge port, a fourth pressure supply port and a fourth pressure discharge port and said four way servovalve is adapted to selectively communicate said first chamber with said third pressure supply port and said third pressure discharge port and to selectively communicate said second chamber with said fourth pressure supply port and with said fourth pressure discharge port;
a feedback device capable of measuring at least one property of said first chamber and providing a signal proportional to said property;
a controller capable of receiving said signal and comparing said property to a desired property to determine a difference and activating at least one of said first servovalve, said second servovalve or said four way servovalve to decrease said difference.

22. The hydraulic control system of claim 21 wherein said controller does not activate said third pressure supply port, said third pressure discharge port, said fourth pressure supply port or said fourth pressure discharge port when said difference is above a predetermined value.

23. The hydraulic control system of claim 21 wherein said controller only activates said third pressure supply port, said third pressure discharge port, said fourth pressure supply port or said fourth pressure discharge port when said difference is below a predetermined value.

24. The hydraulic control system of claim 21 wherein said controller activates said first pressure discharge port and said third pressure supply port together to expand said cylinder.

25. The hydraulic control system of claim 21 wherein said controller activates said second pressure discharge port and said fourth pressure supply port together to contract said cylinder.

26. The hydraulic control system of claim 21 wherein said controller activates said first servovalve, said second servovalve and said four way servovalve to expand said cylinder in accordance with the following process:
when said difference is above a first predetermined value said first pressure supply port supplies hydraulic fluid to said expansion chamber;
when said difference is below said first predetermined value and above a second predetermined threshold said third pressure supply port supplies hydraulic fluid to said expansion chamber;
when said difference is below said second predetermined threshold said third pressure supply port supplies hydraulic fluid to said expansion chamber and said first pressure discharge port discharges hydraulic fluid.

27. The hydraulic control system of claim 21 wherein said controller activates said first servovalve, said second servovalve and said four way servovalve to contract said cylinder in accordance with the following process:
when said difference is above a first predetermined value said second pressure supply port supplies hydraulic fluid to said contraction chamber;
when said difference is below said first predetermined value and above a second predetermined threshold said fourth pressure supply port supplies hydraulic fluid to said contraction chamber;
when said difference is below said second predetermined threshold said fourth pressure supply port supplies hydraulic fluid to said contraction chamber and said second pressure discharge port discharges hydraulic fluid.

28. The hydraulic control system of claim 21 wherein said property is position.

29. The hydraulic control system of claim 21 wherein said property is pressure.

30. The hydraulic control system of claim 21 comprising two properties.

31. The hydraulic control system of claim 30 wherein one of said two properties is position and one of said two properties is pressure.

32. A hydraulic control system for hydraulic fluid between a first chamber and a second chamber and said hydraulic control system comprises:
a first servovalve comprising a first pressure supply port and a first pressure discharge port and adapted to selectively communicate said first chamber with said first pressure supply port and with said first pressure discharge port;
a second servovalve comprising a second pressure supply port and a second pressure discharge port and adapted to selectively communicate said second chamber with said second pressure supply port and with said second pressure discharge port;
a four way servovalve comprising a third pressure supply port, a third pressure discharge port, a fourth pressure supply port and a fourth pressure discharge port and said four way servovalve is adapted to selectively communicate said first chamber with said third pressure supply port and said third pressure discharge port and to selectively communicate said second chamber with said fourth pressure supply port with said fourth pressure discharge port;

a feedback device capable of measuring a property of said cylinder and providing a signal proportional to said property;

a controller capable of receiving said signal and comparing said property to a desired property to determine a difference and activating at least one of said first servovalve, said second servovalve or said four way servovalve to decrease said difference and wherein said controller selects between the following sequences:
 a) said first pressure supply port supplies hydraulic fluid to said first chamber and said second pressure discharge port allows hydraulic fluid to exit said second chamber;
 b) said second pressure supply port supplies hydraulic fluid to said second chamber and said first pressure discharge port allows hydraulic fluid to exit said second chamber;
 c) said third pressure supply port supplies hydraulic fluid to said first chamber and said second pressure discharge port allows hydraulic fluid to exit said second chamber;
 d) said fourth pressure supply port supplies hydraulic fluid to said second chamber and said first pressure discharge port allows hydraulic fluid to exit said second chamber;
 e) said first pressure supply port and said third pressure supply port supply hydraulic fluid to said first chamber and said second pressure discharge port allows hydraulic fluid to exit said second chamber;
 f) said second pressure supply port and said fourth pressure supply port supply hydraulic fluid to said second chamber and said first pressure discharge port allows hydraulic fluid to exit said first chamber;
 g) said third pressure supply port supplies a first amount of hydraulic fluid to said first chamber and said first pressure discharge port allows a second amount of hydraulic fluid to exit said first chamber and said second pressure discharge port allows a third amount of hydraulic fluid to exit said second chamber wherein said first amount is more than said second amount and said third amount equals the difference between said first amount and said second amount; and
 h) said fourth pressure supply port supplies a fourth amount of hydraulic fluid to said second chamber and said second pressure discharge port allows a fifth amount of hydraulic fluid to exit said second chamber and said first pressure discharge port allows a sixth amount of hydraulic fluid to exit said first chamber wherein said fourth amount is more than said fifth amount and said sixth amount equals the difference between said fourth amount and said fifth amount.

33. A method for controlling hydraulic fluid between a first chamber and a second chamber wherein said hydraulic control system comprises:
 a first servovalve comprising a first pressure supply port and a first pressure discharge port and adapted to selectively communicate said first chamber with said first pressure supply port and with said first pressure discharge port;
 a second servovalve comprising a second pressure supply port and a second pressure discharge port and adapted to selectively communicate said second chamber with said second pressure supply port and with said second pressure discharge port;
 a four way servovalve comprising a third pressure supply port, a third pressure discharge port, a fourth pressure supply port and a fourth pressure discharge port and said four way servovalve is adapted to selectively communicate said first chamber with said third pressure supply port and said third pressure discharge port and to selectively communicate said second chamber with said fourth pressure supply port with said fourth pressure discharge port;
 a feedback device capable of measuring a property of said cylinder and providing a signal proportional to said property;
 a controller capable of receiving said signal and comparing said property to a desired property to determine a difference and activating at least one of said first servovalve, said second servovalve or said four way servovalve to decrease said difference and wherein said method comprises:
  causing said first pressure supply port to supply hydraulic fluid to said first chamber and said second pressure discharge port allows hydraulic fluid to exit said second chamber;
  causing said second pressure supply port to supply hydraulic fluid to said second chamber and said first pressure discharge port allows hydraulic fluid to exit said second chamber;
  causing said third pressure supply port to supply hydraulic fluid to said first chamber and said second pressure discharge port allows hydraulic fluid to exit said second chamber;
  causing said fourth pressure supply port to supply hydraulic fluid to said second chamber and said first pressure discharge port allows hydraulic fluid to exit said second chamber;
  causing said first pressure supply port and said third pressure supply port to supply hydraulic fluid to said first chamber and said second pressure discharge port allows hydraulic fluid to exit said second chamber;
  causing said second pressure supply port and said fourth pressure supply port to supply hydraulic fluid to said second chamber and said first pressure discharge port allows hydraulic fluid to exit said first chamber;
  causing said third pressure supply port to supply a first amount of hydraulic fluid to said first chamber and said first pressure discharge port allows a second amount of hydraulic fluid to exit said first chamber and said second pressure discharge port allows a third amount of hydraulic fluid to exit said second chamber wherein said first amount is more than said second amount and said third amount equals the difference between said first amount and said second amount; and
  causing said fourth pressure supply port to supply a fourth amount of hydraulic fluid to said second chamber and said second pressure discharge port allows a fifth amount of hydraulic fluid to exit said second chamber and said first pressure discharge port allows a sixth amount of hydraulic fluid to exit said first chamber wherein said fourth amount is more than said fifth amount and said sixth amount equals the difference between said fourth amount and said fifth amount.

* * * * *